US012262731B2

(12) United States Patent
Wang et al.

(10) Patent No.: US 12,262,731 B2
(45) Date of Patent: Apr. 1, 2025

(54) CUT-STEM SEPARATING AND BAFFLING APPARATUS AND PRIMARY AIR SEPARATION APPARATUS

(71) Applicant: Zhangjiakou Cigarette Factory Co., Ltd., Hebei (CN)

(72) Inventors: Zhen Wang, Hebei (CN); Shubin Jin, Hebei (CN); Peng Ji, Hebei (CN); Jianlong Zhang, Hebei (CN); Duanduan Li, Hebei (CN); Laihong Zhou, Hebei (CN); Huge Liu, Hebei (CN); Xiaohua Yang, Hebei (CN); Zhaohui Ma, Hebei (CN)

(73) Assignee: Zhangjiakou Cigarette Factory Co., Ltd., Zhangjiakou (CN)

( * ) Notice: Subject to any disclaimer, the term of this patent is extended or adjusted under 35 U.S.C. 154(b) by 294 days.

(21) Appl. No.: 18/099,251

(22) Filed: Jan. 19, 2023

(65) Prior Publication Data

US 2023/0148655 A1 May 18, 2023

(30) Foreign Application Priority Data

Jan. 27, 2022 (CN) ......................... 202210099237.4

(51) Int. Cl.
*A24C 5/39* (2006.01)
*B07B 4/02* (2006.01)

(52) U.S. Cl.
CPC .............. *A24C 5/396* (2013.01); *A24C 5/399* (2013.01); *B07B 4/02* (2013.01)

(58) Field of Classification Search
CPC ............ A24C 5/396; A24C 5/399; B07B 4/02
See application file for complete search history.

(56) References Cited

U.S. PATENT DOCUMENTS

2022/0386779 A1* 12/2022 Liu et al. ................. A24B 5/16

FOREIGN PATENT DOCUMENTS

CN 112089090 A * 12/2020 ............... A24B 5/16

* cited by examiner

*Primary Examiner* — Christopher M Rodd
*Assistant Examiner* — Ronnie Kirby Jordan

(57) ABSTRACT

The present invention relates to a cut-stem separating and baffling apparatus and a primary air separation apparatus. The cut-stem separating and baffling apparatus includes a cut-stem separating baffle and struts; and the strut includes a base, a hanging panel, and an inner hexagon adjustment bolt, where the base includes a connecting segment and a support segment that are connected to each other, where the connecting segment is located above the cut-stem separating baffle, and the support segment is located behind the cut-stem separating baffle; the hanging panel includes a transverse hanging panel, and a longitudinal hanging panel, and a connecting hanging panel is disposed in a direction of the longitudinal hanging panel toward the cut-stem separating baffle, where the connecting hanging panel is connected to the cut-stem separating baffle; and the connecting segment of the base is connected to the transverse hanging panel using the inner hexagon adjustment bolt.

10 Claims, 5 Drawing Sheets

CUT-STEM SEPARATING AND BAFFLING APPARATUS AND PRIMARY AIR SEPARATION APPARATUS

CROSS REFERENCE TO RELATED APPLICATION

This application claims priority of Chinese Application No. 202210099237.4 filed on Jan. 27, 2022 and entitled "a cut-stem separating and baffling apparatus and a primary air separation apparatus".

FIELD OF TECHNOLOGY

The present invention relates to the field of cigarette cutting technologies, and in particular to a cut-stem separating and baffling apparatus, and a primary air separation apparatus.

BACKGROUND

The ZJ17 cigarette making and tipping apparatus is the main machine for producing cigarettes. The ZJ17 crimping unit can include three parts: a feeding strip-forming machine, a rolling and forming machine, and a filter tipping machine. The feeding strip-forming machine can include three parts according to the function: a cut-tobacco feeder, a suction former, and a weight controller. The feeding strip-forming machine processes cut tobacco into continuous rods whose density changes steadily according to a rule, and then sends them to the rolling and forming machine. The feeding system loosens the cut tobacco delivered to a material box and removes impurities such as iron impurities, stems, wet lumps of cut tobacco, and mud blocks, so as to provide the air chamber with cut tobacco that is uniform, stable and can flow continuously. The primary air separation apparatus of the feeding system separates and removes impurities from the fed mixed material, which has an important effect on the quality of the cut tobacco.

At present, the operation process of the primary air separation apparatus in the feeding strip-forming machine of the ZJ17 cigarette making and tipping apparatus is roughly as follows:

The cut tobacco feeding belt conveys the mixed material forward at an elevation angle of about 10° and at a relatively high speed (a linear speed of about 2.22 m/s), and the lighter cut tobacco and cut stems are blown to a throwing roller mechanism by the positive pressure of "an airflow curtain" ejected by an upper air injection chamber, enter a vertical duct, and then are absorbed onto a moving absorbing belt, so as to form continuous and uniform tobacco bundles. The relatively heavy tobacco particles (stems) and non-metallic debris particles pass through the airflow curtain by virtue of self-weight inertia thereof and acceleration of the cut tobacco conveying belt, and after crossing the cut-stem separating baffle, fall into the trough of a helical stem returning mechanism. The height of the cut-stem separating baffle determines the number of tobacco stems separated from the tobacco stream. Referring to FIG. 1, the two sides of the cut-stem separating baffle 1' are respectively mounted on the wall panels on two sides using strut seats 2'. Specifically, refer to FIG. 2. A base 21' of the strut seat 2' is fixed to the wall panel on both sides. An adjustment bolt 23' is screwed into the base 21'. A bolt base 23*a*' is provided at the bottom of the adjustment bolt 23', and is screwed to a side-mounted hanging panel. The side-mounted hanging panel 22' is connected to the cut-stem separating baffle 1'. Height of the cut-stem separating baffle 1' can be adjusted by rotating a knurled nut inside the strut seat 2'.

During cigarette production, quality problems of the rolled cigarettes have been always found that the weight of a single cigarette exceeds the standard and the cigarette is punctured. The cigarettes are cut open and checked, and it is found that those problems are all caused by large stems contained in the cut tobacco. Through the adjustment of the height of the cut-stem separating baffle, a too high stem-containing rate of cut tobacco cannot be effectively reduced. How the content of tobacco stems in cut tobacco is decreased has become a problem to be resolved urgently by those skilled in the art.

SUMMARY

To resolve all or some of problems in the related art, the present invention provides a cut-stem separating and baffling apparatus and a primary air separation apparatus.

The present invention provides a cut-stem separating and baffling apparatus, including a cut-stem separating baffle and struts, where the strut is located on both sides of the cut-stem separating baffle; and the strut includes a base, a hanging panel, an inner hexagon adjustment bolt, where

- the base comprises a connecting segment and a support segment that are connected to each other, wherein the connecting segment is located above the cut-stem separating baffle, and the support segment is located behind the cut-stem separating baffle; the connecting segment is provided with an adjustment screw in a vertical direction; and the support segment is configured to be fixed to a wall panel on both sides of the cut-stem separating baffle;
- the hanging panel comprises a transverse hanging panel disposed in a horizontal direction; and a longitudinal hanging panel formed by bending an outer side of the transverse hanging panel, and a connecting hanging panel is disposed in a direction of the longitudinal hanging panel toward the cut-stem separating baffle, wherein the connecting hanging panel is connected to the cut-stem separating baffle; and
- the connecting segment of the base is connected to the transverse hanging panel using the inner hexagon adjustment bolt.

Further, the strut further includes a position correction spring, where the position correction spring is sleeved outside the inner hexagon adjustment bolt, and is located between a bottom surface of the connecting segment and the transverse hanging panel.

Further, an end surface of the support segment facing a direction toward which tobacco stems are thrown is disposed to be an inclined surface.

Further, a horizontal distance between a front end of the inclined surface of the support segment and the cut-stem separating baffle is no less than 10 mm.

Further, the hanging panel is made of stainless steel, with thickness of 2 mm to 3 mm. Further, the longitudinal hanging panel is 2 mm thick, and an end surface of the longitudinal hanging panel facing the cut-stem separating baffle is chamfered at 15° with a size of 2×8 mm.

Further, the strut is made of stainless steel, and the support segment of the strut is thinner than a connecting segment.

Further, the support segment is 10 mm to 15 mm thick, and the connecting segment is 18 mm to 22 mm thick.

The present invention further provides a primary air separation apparatus, including the cut-stem separating and baffling apparatus according to any one of the foregoing descriptions and a shield plate, where the shield plate is disposed above the cut-stem separating baffle, two sides of the shield plate are mounted to the wall panels on two sides of the cut-stem separating baffle respectively; and the shield plate is provided with an adjustment hole, where a position of the adjustment hole corresponds to a position of the adjustment screw of the connecting segment of the strut.

Further, the shield plate is made of plexiglass.

The cut-stem separating and baffling apparatus and the primary air separation apparatus provided by the present invention include the following beneficial effects:

In the cut-stem separating and baffling apparatus provided by the present invention, a structure located in front of the cut-stem separating baffle is canceled, and the strut structure is equipped with a hanging panel structure that can be fixed above, so that only the longitudinal hanging panel in the hanging panel is the tobacco stem baffling region in the entire strut seat structure. In addition, the longitudinal hanging panel is formed by bending the outer side of the transverse hanging panel downwards, and only a side surface of the longitudinal hanging panel in a thickness direction is the tobacco stem baffling region. Therefore, as compared with the existing strut seat, the present invention reduces cut-stem baffling area greatly, improves the separation rate of cut stems, and decreases the content of tobacco stems in cigarettes, thus decreasing the number of cigarettes exceeding the standard weight, and resolving the quality problem of cigarettes being pierced.

The connecting segment of the strut is provided with an adjustment screw in a vertical direction, and is configured to mount the inner hexagon adjustment bolt. The bottom of the inner hexagon adjustment bolt is connected to the transverse hanging panel in the hanging panel, so that the cut-stem separating baffle can be moved up and down by rotating the inner hexagon adjustment bolt. As compared with the existing strut seat, the cut-stem separating and baffling apparatus provided by the present invention can adjust the position of the cut-stem baffle above the connecting segment of the strut, that is, perform operation outside the shield plate, thereby avoiding the safety hazard of operation in the shield plate and improving the safety of operation.

In summary, the cut-stem separating and baffling apparatus provided by the present invention reduces the baffling area of the cut stems by optimizing the structure of the struts, improving the separation rate of the cut stems, and reducing the content of tobacco stems in the cut tobacco, while improving the safety of adjusting the height of the cut-stem separating baffle.

BRIEF DESCRIPTION OF THE DRAWINGS

The above description, and other objectives, features, and advantages of the present invention become more apparent according to more detailed descriptions of exemplary implementations of the present invention with reference to the accompanying drawings. The same reference numeral generally represents the same part in the exemplary implementations of the present invention.

REFERENCE NUMERALS

Figure 1:
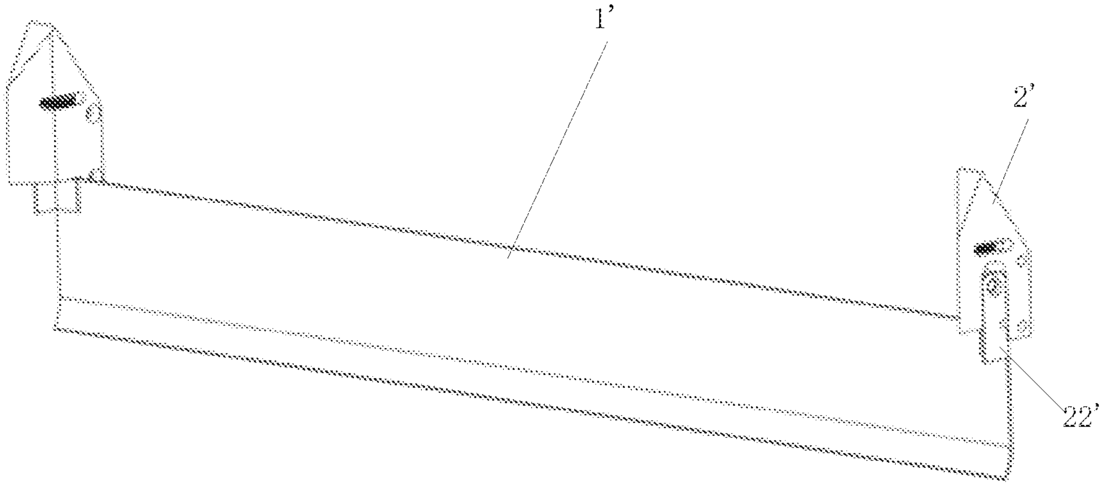
FIG. 1 is a schematic structural diagram of a cut-stem separating baffle in the related art.
Figure 2:
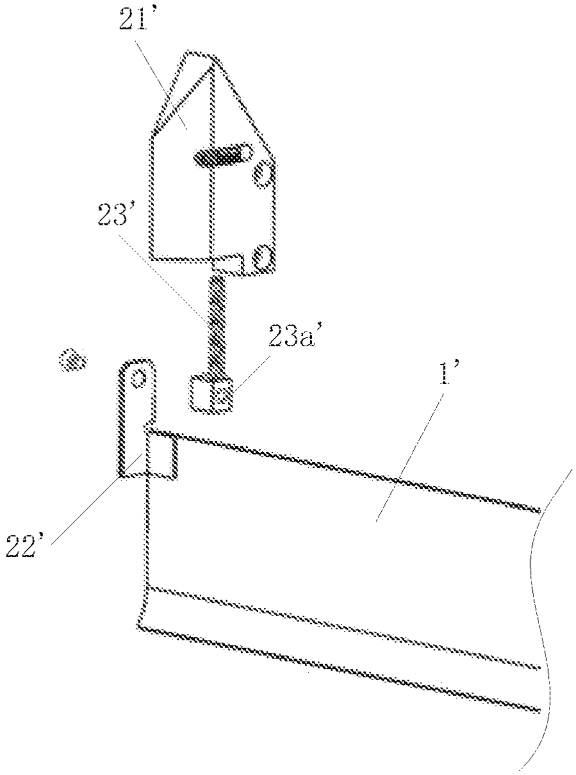
FIG. 2 is a schematic diagram of mounting a cut-stem separating baffle and a strut seat in the related art.

1'—cut-stem separating baffle
2'—strut seat
21'—base
22'—side-mounted hanging panel
23'—adjustment screw
**23*a*'**—bolt base
1—cut-stem separating baffle
2—strut
21—base
211—connecting segment
212—support segment
22—hanging panel
221—transverse hanging panel
222—longitudinal hanging panel
223—connecting hanging panel
23—inner hexagon adjustment bolt
24—position correction spring
3—shield plate
31—adjustment hole

DESCRIPTION OF THE EMBODIMENTS

The technical solutions of the embodiments of the present invention are clearly and completely described below with reference to the accompanying drawings. Apparently, the described embodiments are merely some rather than all of the embodiments of the present invention. All other embodiments obtained by a person of ordinary skill in the art on the basis of the embodiments of the present invention without creative efforts shall fall within the protection scope of the present invention.

The terms used in the present invention are merely intended to describe particular embodiments rather than limiting the invention. As used herein and in the appended claims, the singular forms "a", "the", and "this" are intended to include the plural forms as well, unless the context clearly dictates otherwise. It should also be understood that the term "and/or" as used herein refers to and includes any and all possible combinations of one or more of the associated listed items.

It should be understood that although the terms "first", "second", "third" and the like may be used in the present invention to describe various information, the information should not be limited to these terms. These terms are only used to distinguish information of the same type from one another. For example, without departing from the scope of the present invention, first information may also be referred to as second information, and similarly, second information may also be referred to as first information. Thus, a feature defined by "first" or "second" may explicitly or implicitly includes one or more the features. In the description of the present invention, "plurality of" means two or more, unless otherwise specifically defined.

An embodiment of the present invention provides a cut-stem separating and baffling apparatus, so as to increase the separation rate of cut stems and reduce the content of cut stems in cut tobacco.

Though researches, the main reason of low separation rate of the tobacco stems is as follows: The tobacco stems that have been air-selected by a primary air separation apparatus collide with the strut seat fixed to the wall panel on both sides during transportation. Specifically, the tobacco stems that pass through the airflow curtain of the primary air separation apparatus collide with the front inclined surface of the strut seat base, and rebound at a refraction angle; some other tobacco stems hit the bolt base of the strut seat and rebound. As a result, some tobacco stems are unable to cross get over cut-stem separating baffle.

A primary air separation apparatus of the YJ17 cigarette making and tipping apparatus is described specifically.

The total width of the air injection chamber on the primary air separation apparatus is $820^-$ mm, and the air injection chamber is installed between the wall panels with a width of about $820^+$ mm. The air duct plate mounted on the upper air injection chamber has 137 injection-port diversion trenches thereon, where the diversion trench is 1.5 mm wide and 5 mm long. Through such a disposal, an "airflow curtain" with a width of 820 mm is formed to separate stems from a fed cut tobacco mixture, with a conveying width of 820 mm. The conveying width of tobacco stems after separation is still 820 mm.

The total width of the cut-stem separating baffle is 820 mm. The cut-stem separating baffle is fixed and positioned by two left and right strut seats, and the left and right strut seats are respectively mounted to left and right wall panels, that is, the distance between the outer sides of the two strut seats is $820^-$ mm. The thickness of a single strut seat is 20 mm, so it is determined that under the effect of strut seats on the left and right sides, the middle part with a width of 780 mm is a region through which the separated tobacco stems pass, and the 20 mm parts on the left and right sides are the baffling regions of the tobacco stems conveyed after separation.

According to the analysis of the mounting structure of the air injection chamber on the primary air separation apparatus and the cut-stem separating baffle, it can be concluded that left and right mounting positions of the upper air injection chamber and those of the cut-stem separating baffle coincide consistently, and a difference between the conveying width of cut tobacco and the conveying width of separated cut stems is 40 mm. The main reason of such difference is caused by the thickness of the strut seat of the cut-stem separating baffle. Because of this, most of the separated tobacco stems pass through the cut-stem separating baffle from the 780 mm region and enter a helical stem returning mechanism, but a small quantity of separated tobacco stems are baffled by the strut seat on both sides of the cut-stem separating baffle, and thus their movement track changes in a baffling region of 20 mm+20 mm. The separated tobacco stems are not thrown into the helical stem returning mechanism, but are turned by the refraction and reaction force of the strut seat, fall into a throwing roller mechanism, and directly enter an absorption forming system to be rolled into cigarettes. After wrapped into cigarettes, the small quantity of separated tobacco stems may cause quality problems, for example, a cigarette is pierced, a single cigarette is overweighted, the density of a cigarette is uneven, or a circumference mark is too large.

Figure 3:
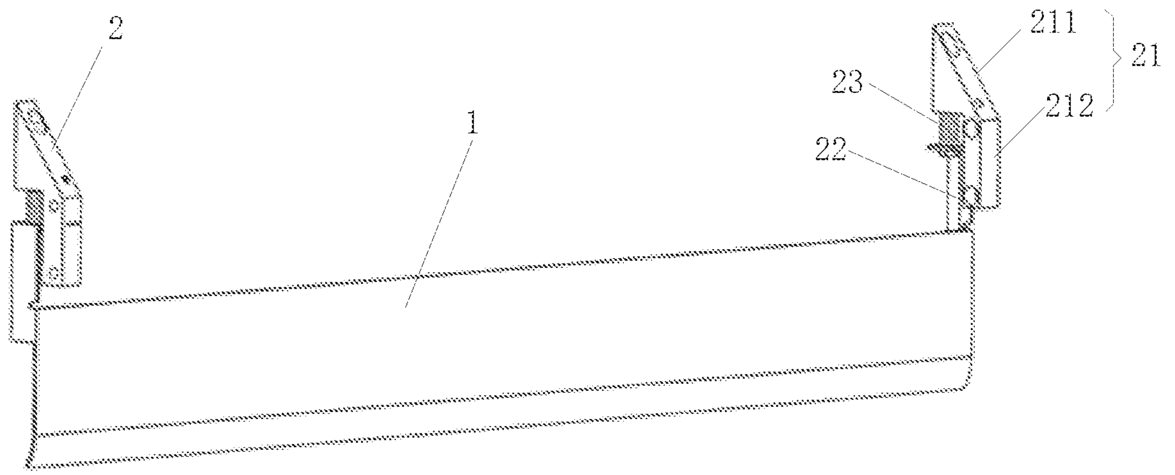
FIG. 3 is a schematic diagram of a dimensional structure of a cut-stem separating and baffling apparatus according to an embodiment of the present invention.

Therefore, in the present invention, for resolving of the problem that the separation of stems is subject to running resistance at the cut-stem baffle, the obstruction of the strut seat to the separated tobacco stems needs to be eliminated or reduced. Based on this, an embodiment of the present invention provides a cut-stem separating and baffling apparatus. Referring to FIG. 3, This apparatus includes a cut-stem separating baffle 1 and struts 2, where the strut 2 is located on both sides of the cut-stem separating baffle 1; and the strut 2 includes a base 21, a hanging panel 22, an inner hexagon adjustment bolt.

Figure 4:
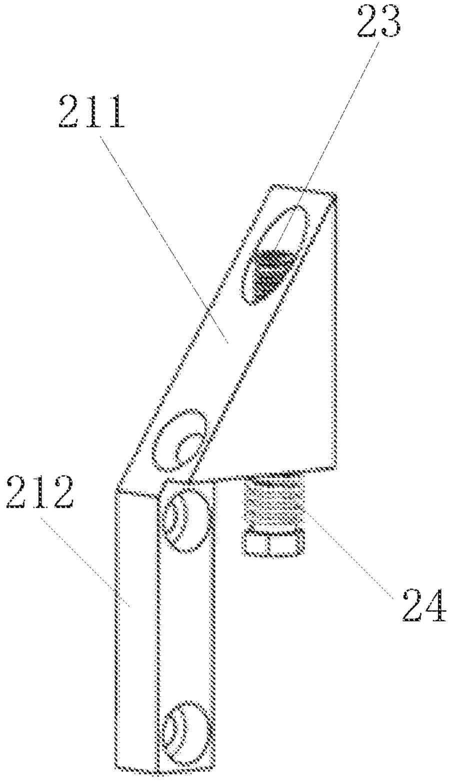
FIG. 4 is a schematic diagram of a dimensional structure of a strut in a cut-stem separating and baffling apparatus according to an embodiment of the present invention.
Figure 5:
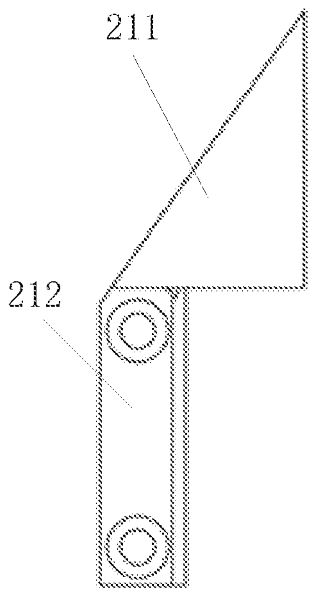
FIG. 5 is a front view of a strut in a cut-stem separating and baffling apparatus according to an embodiment of the present invention.
Figure 6:
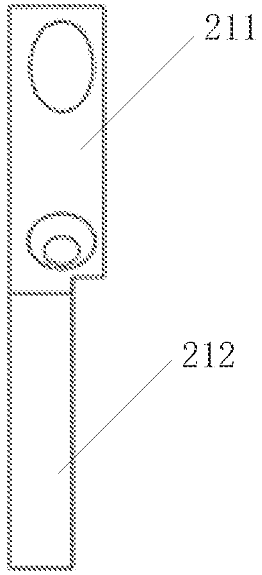
FIG. 6 is a side view of a strut in a cut-stem separating and baffling apparatus according to an embodiment of the present invention.

Referring to FIGS. 4 to 6, the base 21 includes a connecting segment 211 and a support segment 212 that are connected to each other, where the connecting segment 211 is located above the cut-stem separating baffle 1, and the support segment 212 is located behind the cut-stem separating baffle 1; the connecting segment 211 is provided with an adjustment screw in a vertical direction; and the support segment 212 is configured to support a wall panel on both sides of the cut-stem separating baffle 1.

Figure 7:
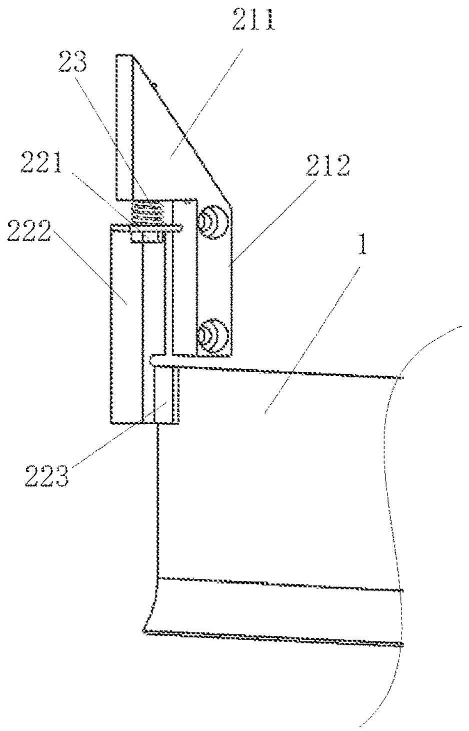
FIG. 7 is a schematic diagram of a partial structure of a cut-stem separating and baffling apparatus according to an embodiment of the present invention.

Referring to FIG. 7, the hanging panel 22 includes a transverse hanging panel 221 disposed in a horizontal direction; and a longitudinal hanging panel 222 formed by bending an outer side of the transverse hanging panel 221, and a connecting hanging panel 223 is disposed in a direction of the longitudinal hanging panel 222 toward the cut-stem separating baffle 1, where the connecting hanging panel 223 is connected to the cut-stem separating baffle 1.

The connecting segment 211 of the base 21 is connected to the transverse hanging panel 221 using the inner hexagon adjustment bolt 23. In other words, after passing through the adjustment screw hole of the connecting segment 211, the inner hexagon adjustment bolt 23 is connected to the transverse hanging panel 221.

In the cut-stem separating and baffling apparatus provided by this embodiment, the strut 2 configured to fix the cut-stem separating baffle 1 includes the base 21, the hanging panel 22, and the inner hexagon adjustment bolt 23. The support segment 212 of the base 21 is fixed to the wall panel on both sides of the cut-stem separating baffle 1, and is located behind the cut-stem separating baffle 1. The connecting segment 211 is connected to the transverse hanging panel 221 of the hanging panel 22 using the inner hexagon adjustment bolt 23, and is located above the cut-stem separating baffle 1. The connecting hanging panel 223 of the hanging panel 22 is connected to the cut-stem separating baffle 1. As compared with the existing strut seat of the cut-stem baffle, a structure located in front of the cut-stem separating baffle 1 in this embodiment is canceled, and the strut structure is equipped with a hanging panel 22 that can be fixed above, so that only the longitudinal hanging panel 222 in the hanging panel 22 is the cut stem baffling region in the entire strut seat structure. In addition, the longitudinal hanging panel 222 is formed by bending the outer side of the transverse hanging panel 221 downwards, and only a side surface of the longitudinal hanging panel 222 in a thickness direction is the tobacco stem baffling region. Therefore, as compared with the existing strut seat, the present invention reduces cut-stem baffling area greatly, improves the separation rate of cut stems, and decreases the content of tobacco stems in cigarettes, thus decreasing the number of cigarettes exceeding the standard weight, and resolving the quality problem of cigarettes being pierced.

From the above, it can be seen that the thinner the longitudinal hanging panel 222, the smaller the baffling region of tobacco stems, which is more conducive to improving the separation rate of the tobacco stems. Further, in this embodiment, the hanging panel 22 is made of stainless steel with a thickness of 2 mm to 3 mm, more preferably 2 mm. The stainless steel hanging panel 22 of this relatively small thickness can meet the requirements of the mechanical properties of connecting the cut-stem separating baffle 1. Further, the longitudinal hanging panel 222 is 2 mm thick, and an end surface of the longitudinal hanging panel 222 facing a direction toward which cut stems are thrown is chamfered at 15° with a size of 2×8 mm. More preferably, the stainless steel hanging panel 22 is integrally formed. In addition, for improvement of connection firmness between the hanging panel 22 and the cut-stem separating baffle 1, the connecting hanging panel 223 of the hanging panel 22 is welded with the cut-stem separating baffle 1.

In the foregoing structure of the base 21, the connecting segment 211 is located above the cut-stem separating baffle 1, and the support segment 212 is located behind the cut-stem separating baffle 1. No base structure is disposed in front of the cut-stem separating baffle 1, to reduce the obstruction to the tobacco stems. The top surface of the connecting segment 211 may be set as an inclined surface having the same inclination angle as that of the shield plate, so as to facilitate mounting thereon. The connecting segment 211 is provided with an adjustment screw in a vertical direction, and is configured to mount the inner hexagon adjustment bolt 23. The bottom of the inner hexagon adjustment bolt 23 is connected to the transverse hanging panel 221 in the hanging panel 22, so that the cut-stem separating baffle 1 can be moved up and down by rotating the inner hexagon adjustment bolt 23. As compared with the existing strut seat, the cut-stem separating and baffling apparatus provided by this embodiment can adjust the position of the cut-stem separating baffle 1 above the connecting segment 211 of the strut 2, that is, perform operations outside the shield plate, thereby avoiding the safety hazard of operation in the shield plate and improving the safety of operation.

The support segment 212 is configured for supporting and fixing, and is fixed to the wall panel on both sides of the cut-stem separating baffle 1 when being in use. The support segment 212 may be provided with two or more counterbores, and the bottom of the counterbore is provided with a screw hole for bolting the wall panel. Because the support segment is located behind the cut-stem separating baffle 1, although the thrown tobacco stems may collide with the support segment 212, it can be ensured that the tobacco stems after collision fall behind the cut-stem separating baffle 1 by adjusting an inclining angle of an end surface of the support segment 212 and/or a horizontal distance between the support segment 212 and the cut-stem separating baffle 1 according to the speed at which the tobacco stems are thrown, thus falling into the helical stem returning mechanism. Further, the end surface of the support segment 212 facing the direction toward which the tobacco stems are thrown is preferably set as an inclined surface, so that the collided tobacco stems move towards the middle of the cut-stem separating baffle 1. More preferably, an end surface of the support segment 212 facing a direction toward which tobacco stems are thrown is disposed to be an inclined surface at 45°. Further, preferably, a horizontal distance between a front end of the inclined surface of the support segment 212 and the cut-stem separating baffle 1 is disposed to be no less than 10 mm, so as to prevent the tobacco stems from rebounding and falling back into the helical stem returning mechanism. In addition, a vertical distance between a bottom surface of the inner hexagon adjustment bolt 23 and the top surface of the cut-stem separating baffle 1 is disposed to be no less than 5 cm, preferably, being 8 cm to 12 cm, more preferably, being 10 cm, to prevent the tobacco stems from colliding with the inner hexagon adjustment bolt 23 and the transverse hanging panel 221.

Referring to FIG. 3 and FIG. 6, for reduction of the baffling range of the support segment 212 to tobacco stems, the support segment 212 of the strut 2 in this application is preferably disposed to be thinner than the connecting segment 211, and at the same time, in order to ensure the connection strength, the strut 2 is made of stainless steel. Preferably, the support segment 212 is 10 mm to 15 mm thick, and the connecting segment 211 is 18 mm to 22 mm thick. More preferably, the support segment 212 is 12 mm thick, and the connecting segment 211 is 20 mm thick.

In the cut-stem separating and baffling apparatus provided in this embodiment, the position of the cut-stem separating baffle 1 is adjusted upwards and downwards by rotating the inner hexagon adjustment bolt, and two ends of the cut-stem separating baffle 1 are hanged below the inner hexagon adjustment bolts 23 at two ends respectively using the hanging panels 22. In the process of rotating the inner hexagon adjustment bolt 23 to drive the cut-stem separating baffle 1 to move up and down, because the position where the hanging panel 22 is connected to the inner hexagon adjustment bolt 23 is not at the center of the cut-stem separating baffle 1, the center of gravity may be shifted, and the inner hexagon adjustment bolt 23 is likely to be stuck when rotating. For this, preferably, the strut 2 further includes a position correction spring 24. Referring to FIG. 4, the position correction spring 24 is sleeved outside the inner hexagon adjustment bolt 23, and is located between a bottom surface of the connecting segment 211 and the transverse hanging panel 221. The position correction spring 24 is used to apply a specific balance force to two ends, of the cut-stem separating baffle 1, connected to the connecting hanging panels 223, so as to stabilize the center of gravity of the cut-stem separating baffle 1, and help the center of gravity of the cut-stem separating baffle 1 not to shift, thereby resolving the problem that the adjusting part (for example, the inner hexagon adjustment bolt) gets stuck when height of the stem separating baffle 1 is adjusted.

From the above, it can be known that the cut-stem separating and baffling apparatus provided by this embodiment of the present invention has the following advantages:

In this embodiment of the present invention, a structure located in front of the cut-stem separating baffle is canceled, and the strut structure is equipped with a hanging panel structure that can be fixed above, so that only the longitudinal hanging panel in the hanging panel is the tobacco stem baffling region in the entire strut seat structure. In addition, the longitudinal hanging panel is formed by bending the outer side of the transverse hanging panel downwards, and only a side surface of the longitudinal hanging panel in a thickness direction is the tobacco stem baffling region. Therefore, as compared with the existing strut seat, the present invention reduces cut-stem baffling area greatly, improves the separation rate of cut stems, and decreases the content of tobacco stems in cigarettes, thus decreasing the number of cigarettes exceeding the standard weight, and resolving the quality problem of cigarettes being pierced.

The connecting segment of the strut is provided with an adjustment screw in a vertical direction, and is configured to mount the inner hexagon adjustment bolt. The bottom of the inner hexagon adjustment bolt is connected to the transverse hanging panel in the hanging panel, so that the cut-stem separating baffle can be moved up and down by rotating the inner hexagon adjustment bolt. As compared with the existing strut seat, the cut-stem separating and baffling apparatus provided by this embodiment of the present invention can adjust the position of the cut-stem baffle above the connecting segment of the strut, that is, perform operations outside the shield plate, thereby avoiding the safety hazard of operation in the shield plate and improving the safety of operation.

In summary, the cut-stem separating and baffling apparatus provided by this embodiment of the present invention reduces the baffling area of the cut stems by optimizing the structure of the struts, improving the separation rate of the cut stems, and reducing the content of tobacco stems in the cut tobacco, while improving the safety of adjusting the height of the cut-stem separating baffle.

Figure 8:
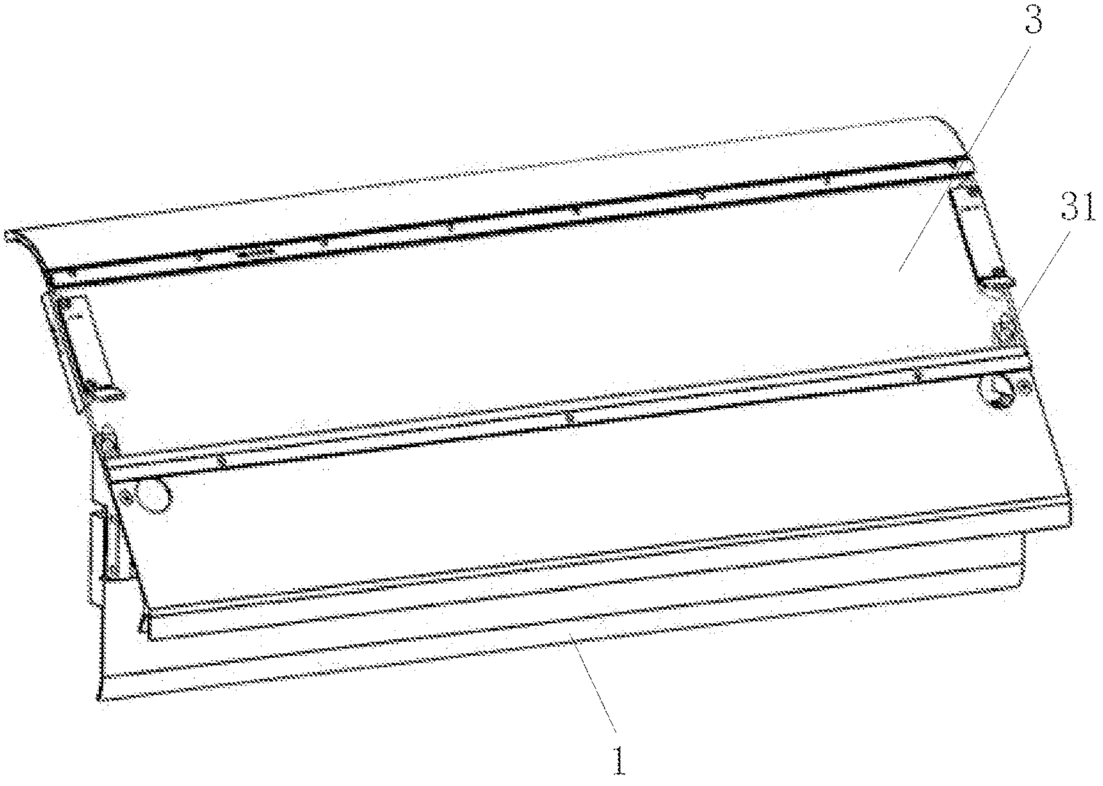
FIG. 8 is a schematic diagram of a dimensional structure of a primary air separation apparatus according to an embodiment of the present invention.

Another embodiment of the present invention further provides a primary air separation apparatus. Referring to FIG. 8, the primary air separation apparatus includes the cut-stem separating and baffling apparatus in the foregoing embodiment and a shield plate 3, where the shield plate 3 is disposed above the cut-stem separating baffle 1, two sides of the shield plate 3 are mounted to the wall panels on two sides of the cut-stem separating baffle 1 respectively; and the shield plate 3 is provided with an adjustment hole 31, where a position of the adjustment hole 31 corresponds to a position of the adjustment screw of the connecting segment of the strut.

Further, the shield plate is preferably made of plexiglass. The plexiglass being of a transparent material can help the operator to observe the internal conditions of the shield plate.

The primary air separation apparatus provided by this embodiment is provided with the cut-stem separating and baffling apparatus, and therefore the primary air separation apparatus also has the advantage of high cut-stem separation rate, which is conducive to reducing the content of the tobacco stems in the cut tobacco, thereby improving the safety of operation to adjust the height of the cut-stem separating baffle.

The present invention is further described in detail with reference to the accompanying drawings and examples:

Comparative example 1—Primary air separation apparatus of YJ17 cigarette making and tipping apparatus.

Figure 9:
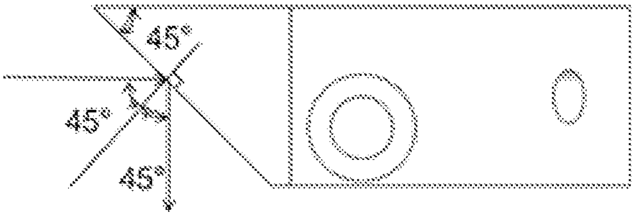
FIG. 9 is a schematic diagram of a movement track of a tobacco stem after collision with an end surface of a strut seat in an existing primary air separation apparatus.

A strut seat as shown in FIG. 1 is used. Its thickness is 20 cm, and an inclined angle of its front end surface (an end surface facing a direction toward which tobacco stems are thrown) is 45°. The baffling area of the strut seat to tobacco stems is calculated as follows:

The tobacco stems that have been air-selected by an air separation apparatus collide with the strut seat fixed to the wall panel on both sides during transportation. The tobacco stems that pass through the airflow curtain of the primary air separation apparatus hit the front inclined surface of the strut base, and rebound at a refraction angle. The initial velocity of the tobacco stems is consistent with the conveying velocity of the cut tobacco feeding tarpaulin: 2.2 m/s, and further, their directions are also consistent: 10° upward. After a distance of movement, under the influence of the primary air separation apparatus, when the tobacco stems hit the front slope of the strut seat, their velocity direction is approximately horizontal. After the movement track of the collided tobacco stems is analyzed, the collision is approximately considered to be elastic. As shown in FIG. 9, it can be seen that the incidence angle of the tobacco stem is equal to the reflection angle, that is, $F_{incidence}=F_{reflection}$. Because the front part of the strut seat is an inclined surface which forms an 45° angle with the wall, the velocity direction of the tobacco stem after reflection is perpendicular to the wall surface, and the velocity is equal to or greater than 2.2 m/s. The velocity direction of the refracted tobacco stem is almost parallel to the cut-tobacco baffle, and the tobacco stem moves in a parabola under the action of gravity, which thus baffles other tobacco stems above the cut-stem separating and baffling apparatus, and also affects the cut-stem separation to some extent. According to the operation manual of the feeding strip-forming machine and the relative position of the cut-tobacco feeding tarpaulin and the cut-stem separating baffle, the position where the tobacco stem hits the front inclined surface of the strut seat is at most about 34 mm from the cut-stem separating baffle.

According to the free fall motion, the time t for the tobacco stems to fall to the upper position of the cut-stem separating baffle is calculated:

$$t=\sqrt{(2\ h/g)}=\sqrt{(2*0.034/9.8)}\approx 0.08\ s$$

During this period, the lateral displacement of the tobacco stem is: S=Vt=2.2*0.08=0.176 m=17.6 cm.

Figure 10:
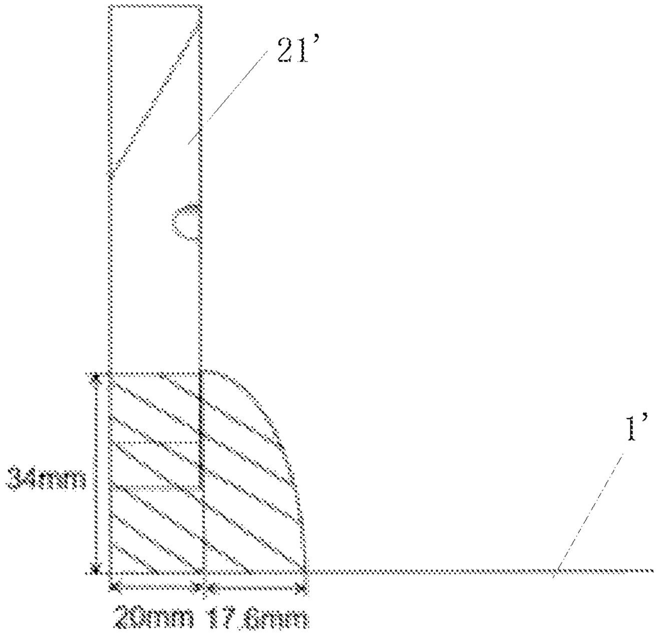
FIG. 10 is a schematic diagram of an area of a strut baffling a tobacco stem in a primary air separation apparatus.

Based on the above analysis, the region where the existing strut seat blocks cut stems is shown in the shaded part in FIG. 10.

Through calculation on the ratio of the area of the shaded part to the total area of passing regions of the cut stems, the percentage of tobacco stems being baffled and the separation rate of cut stems can be estimated.

The total area of passing regions of the cut stems is: 820 mm (airflow curtain width)×34 mm=27880 $mm^2$.

The area of the shaded part is: 2×(20×34+2/3(17.6×34))=2158 $mm^2$.

Therefore, the percentage of tobacco stems being baffled=area of the shaded part/total area of passing regions of the cut stems, that is, $$2158/27880\approx 7.7\%.$$

The separation rate of cut stems≈100%−7.7%=92.3%.

In other words, 7.7% of the mixed cut tobacco from which cut stems have not been separated enters the absorption forming system.

Diamond cigarette (hard red series) is taken as an example:

target weight: 0.700 g/piece;

production speed: 7000 pieces/min; and cut tobacco returning quantity: 25 to 35%, where $$0.7\ g\times 7000\ pieces\times[1+(25-35\%)]\times 7.7\%=472-509\ g/min.$$

It is calculated that about 472-509 grams per minute of cut tobacco from which cut stems have not been separated enters the next procedure.

According to the calculation of 8 hours per shift, about 227-244 kg of cut tobacco from which cut stems have not been separated is rolled into cigarettes.

Embodiment 1—Improved primary air separation apparatus of YJ17 cigarette making and tipping apparatus.

The cut-stem separating and baffling apparatus shown in FIG. 3 is used, and the thickness of the longitudinal hanging panel of the hanging panel is 2 mm. The vertical distance from the bottom surface of the inner hexagon adjustment bolt to the top surface of the cut-stem separating baffle is 10 cm. An end surface of the support segment facing a direction toward which tobacco stems are thrown is disposed to be an inclined surface at 45°. The distance between the front end of the inclined surface and the cut-stem separating baffle is 10 mm.

The width of the cut tobacco baffle of the primary air separation apparatus is 820 mm. The improved strut base no longer affects the running of the cut tobacco. However, only the longitudinal hanging panel with a width of 2 mm slightly baffles the cut tobacco (tobacco stem baffling is minimized through chamfering).

Through calculation, it can be concluded that the baffling rate of tobacco stems is only 2×2 mm/820 mm=0.49% at most.

That is, only less than 0.49% of the separated tobacco stems does not pass through the helical stem returning mechanism, and enters the absorption forming system.

Diamond cigarette (hard red series) is still taken as an example:

target weight: 0.700 g/piece;

production speed: 7000 pieces/min; and cut tobacco returning quantity: 25 to 35%, where $$0.7\ \text{g}\times 7000\ \text{pieces}\times[1+(25-35\%)]\times 0.49\%=30-32.5\ \text{g/min}.$$

According to the calculation of 8 hours per shift, about 14-15 kg of mixed cut tobacco at most from which cut stems have not been separated is rolled into cigarettes.

It can be seen from the above embodiments, after the cut-stem separating and baffling apparatus provided by the present invention is used, according to calculation of 8 hours per shift, the separation rate of cut stems with the original structure before improvement is 92.3%, and about 227-244 kg of separated tobacco stems are rolled into cigarettes. The separation rate of the cut stems with the improved structure is at least 99.51%, and about 14-15 kilograms of separated tobacco stems are rolled into cigarettes. It can be seen from above that the present invention improves the efficiency of controllable cut stem separation, achieves better effect of the cut stem separation, improves the internal and external quality of cigarettes, thereby effectively guaranteeing the product quality. In this case, the strut base and the adjustment bolt being adjusted facilitates adjustment outside the device and eradicates the safety hazards.

The above describes various embodiments of the present invention, the foregoing description is exemplary rather than being exhaustive, and is not limited to the disclosed embodiments. Many modifications and alterations are obvious to those of ordinary skill in the art without departing from the scope and spirit of the described embodiments. The terms selected herein are intended to best explain the principle of each embodiment, practical application or improvement of technology in the market, or to enable other ordinary skilled in the art to understand each embodiment disclosed herein.

What is claimed is:

1. A cut-stem separating and baffling apparatus, comprising a cut-stem separating baffle and struts, wherein a strut is located on each side of the cut-stem separating baffle; and each strut comprises a base, a hanging panel, an inner hexagon adjustment bolt, wherein the base comprises a connecting segment and a support segment that are connected to each other, wherein the connecting segment is located above the cut-stem separating baffle, and the support segment is located behind the cut-stem separating baffle; the connecting segment is provided with an adjustment screw in a vertical direction; and the support segment is configured to be fixed to a wall panel on each side of the cut-stem separating baffle;

the hanging panel comprises a transverse hanging panel disposed in a horizontal direction; and a longitudinal hanging panel formed by bending an outer side of the transverse hanging panel, wherein a connecting hanging panel is disposed in a direction of the longitudinal hanging panel toward the cut-stem separating baffle, wherein the connecting hanging panel is connected to the cut-stem separating baffle; and the connecting segment of the base is connected to the transverse hanging panel using the inner hexagon adjustment bolt.

2. The cut-stem separating and baffling apparatus according to claim 1, wherein each strut further comprises a position correction spring, wherein the position correction spring is sleeved outside the inner hexagon adjustment bolt, and is located between a bottom surface of the connecting segment and the transverse hanging panel.

3. The cut-stem separating and baffling apparatus according to claim 1, wherein an end surface of the support segment facing a direction toward which tobacco stems are thrown is disposed to be an inclined surface.

4. The cut-stem separating and baffling apparatus according to claim 3, wherein a horizontal distance between a front end of the inclined surface of the support segment and the cut-stem separating baffle is no less than 10 mm.

5. The cut-stem separating and baffling apparatus according to claim 1, wherein the hanging panel is made of stainless steel, with thickness of 2 mm to 3 mm.

6. The cut-stem separating and baffling apparatus according to claim 5, wherein the longitudinal hanging panel is 2 mm thick, and an end surface of the longitudinal hanging panel facing the cut-stem separating baffle is chamfered at 15° with a size of 2×8 mm.

7. The cut-stem separating and baffling apparatus according to claim 1, wherein each strut is made of stainless steel, and the support segment of the strut is thinner than a connecting segment.

8. The cut-stem separating and baffling apparatus according to claim 7, wherein the support segment is 10 mm to 15 mm thick, and the connecting segment is 18 mm to 22 mm thick.

9. A primary air separation apparatus, comprising the cut-stem separating and baffling apparatus according to claim 1 and a shield plate, wherein the shield plate is disposed above the cut-stem separating baffle, two sides of the shield plate are mounted to the wall panels on two sides of the cut-stem separating baffle respectively; and the shield plate is provided with an adjustment hole, wherein a position of the adjustment hole corresponds to a position of the adjustment screw of the connecting segment of each strut.

10. The primary air separation apparatus according to claim 9, wherein the shield plate is made of plexiglass.

* * * * *